United States Patent
Stieg et al.

(10) Patent No.: US 10,401,030 B2
(45) Date of Patent: Sep. 3, 2019

(54) AXISYMMETRIC COMPONENTS AND METHODS FOR FORMING AXISYMMETRIC COMPONENTS

(71) Applicant: General Electric Company, Schenectady, NY (US)

(72) Inventors: Michael Alan Stieg, Cincinnati, OH (US); Brian Christopher Towle, Leawood, KS (US); Darrell Glenn Senile, Oxford, OH (US); Gregory Scott Phelps, Cincinnati, OH (US); Jeffrey Douglas Johnson, Newark, DE (US)

(73) Assignee: General Electric Company, Schenectady, NY (US)

( * ) Notice: Subject to any disclaimer, the term of this patent is extended or adjusted under 35 U.S.C. 154(b) by 360 days.

(21) Appl. No.: 15/207,814

(22) Filed: Jul. 12, 2016

(65) Prior Publication Data

US 2018/0017258 A1    Jan. 18, 2018

(51) Int. Cl.
*B32B 5/12* (2006.01)
*B29C 70/30* (2006.01)
(Continued)

(52) U.S. Cl.
CPC .............. *F23R 3/007* (2013.01); *B29C 70/30* (2013.01); *B29C 70/386* (2013.01); *B32B 5/12* (2013.01);
(Continued)

(58) Field of Classification Search
CPC ........... B29C 70/30–70/388; B31C 1/00–1/06; B31C 3/00–3/04; B32B 5/12; B32B 7/14
See application file for complete search history.

(56) References Cited

U.S. PATENT DOCUMENTS

| 6,851,643 | B2 * | 2/2005 | Qiu | B31C 3/00 138/144 |
| 2008/0116614 | A1 * | 5/2008 | Morrison | C04B 35/117 264/332 |
| 2013/0251958 | A1 * | 9/2013 | Gawn | B29C 70/083 428/189 |

FOREIGN PATENT DOCUMENTS

| EP | 1 900 507 A1 | 3/2008 |
| FR | 2 878 608 A1 | 6/2006 |

(Continued)

OTHER PUBLICATIONS

International Search Report and Written Opinion issued in connection with corresponding PCT Application No. PCT/US2017/040799 dated Oct. 17, 2017.

*Primary Examiner* — Stephen E Rieth
(74) *Attorney, Agent, or Firm* — Dority & Manning, P.A.

(57) ABSTRACT

Components and methods for forming components are provided. For example, a method for forming a component includes laying up a plurality of plies to form a component preform that defines an axis of symmetry and a circumferential direction. Laying up the plurality of plies includes overlapping ends of the plurality of plies to define overlap regions and offsetting the overlap regions along the circumferential direction such that any radial line drawn from the axis of symmetry through the plies passes through only one overlap region. In another embodiment, a component includes a body that is symmetric about an axis of symmetry and that defines a circumferential direction and a radial direction. The body is formed from a plurality of plies and has a substantially uniform thickness. Ends of the plurality of plies are overlapped to define a plurality of overlap regions, which are offset along the circumferential direction.

18 Claims, 6 Drawing Sheets

(51) Int. Cl.
*B29C 70/38* (2006.01)
*F02C 3/04* (2006.01)
*F23R 3/00* (2006.01)
*F23R 3/28* (2006.01)
*F23R 3/60* (2006.01)

(52) U.S. Cl.
CPC ............... *F02C 3/04* (2013.01); *F23R 3/286* (2013.01); *F23R 3/60* (2013.01); *F05D 2220/32* (2013.01)

(56) References Cited

FOREIGN PATENT DOCUMENTS

| | | |
|---|---|---|
| GB | 2485215 A | 5/2012 |
| WO | 2013/162989 A1 | 10/2013 |

\* cited by examiner

AXISYMMETRIC COMPONENTS AND METHODS FOR FORMING AXISYMMETRIC COMPONENTS

FIELD OF THE INVENTION

The present subject matter relates generally to axisymmetric components and, more particularly, to axisymmetric components and methods of forming axisymmetric components of gas turbine engines.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

More commonly, non-traditional high temperature materials, such as composite materials including ceramic matrix composite (CMC) materials, are being used for various components within gas turbine engines. For example, because CMC materials can withstand relatively extreme temperatures, there is particular interest in replacing components within the flow path of the combustion gases with CMC materials. However, typical methods of constructing components from plies of a material, such as plies of a CMC material, often result in components having local variations in thickness and/or unsmooth surfaces. Components that have a non-uniform thickness can negatively impact tolerances such that the components do not line up with or are difficult to line up with one or more interfacing components. Additionally, components with non-uniform thickness within the component present manufacturing difficulties. For example, local variations in component thickness can result in inconsistent machining of holes or apertures in the component.

Accordingly, a method for forming a component that reduces or eliminates variations in component thickness would be desirable. In particular, a method for forming an axisymmetric component that reduces or eliminates variations in component thickness while providing a component having hoop strength would be advantageous. Axisymmetric components having a substantially uniform thickness throughout the component also would be useful.

BRIEF DESCRIPTION OF THE INVENTION

Aspects and advantages of the invention will be set forth in part in the following description, or may be obvious from the description, or may be learned through practice of the invention.

In one exemplary aspect of the present subject matter, a method for forming a component is provided. The method includes laying up a plurality of plies to form a component preform. The component preform defines an axis of symmetry and a circumferential direction. Laying up the plurality of plies includes overlapping ends of the plurality of plies, each overlapped end defining an overlap region, and offsetting the overlap regions along the circumferential direction such that any radial line drawn from the axis of symmetry through the plies passes through only one overlap region.

In another exemplary aspect of the present subject matter, a method for forming a component is provided. The method includes laying up a plurality of plies to form a component preform. The component preform defines an axis of symmetry and a circumferential direction. Laying up the plurality of plies includes overlapping each end of a plurality of first plies with an end of a plurality of second plies. Each overlapped end of a first ply is in contact with one end of a second ply over a contact length. Laying up the plurality of plies further includes offsetting the overlapped ends along the circumferential direction such that any radial line drawn from the axis of symmetry through the plurality of plies passes through only one contact length.

In another exemplary aspect of the present subject matter, a component is provided. The component includes a body that is symmetric about an axis of symmetry. The body defines a circumferential direction about the axis of symmetry and a radial direction orthogonal to the axis of symmetry. The body is formed from a plurality of plies, and the body has a substantially uniform thickness. Ends of the plurality of plies are overlapped to define a plurality of overlap regions, and the overlap regions are offset along the circumferential direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
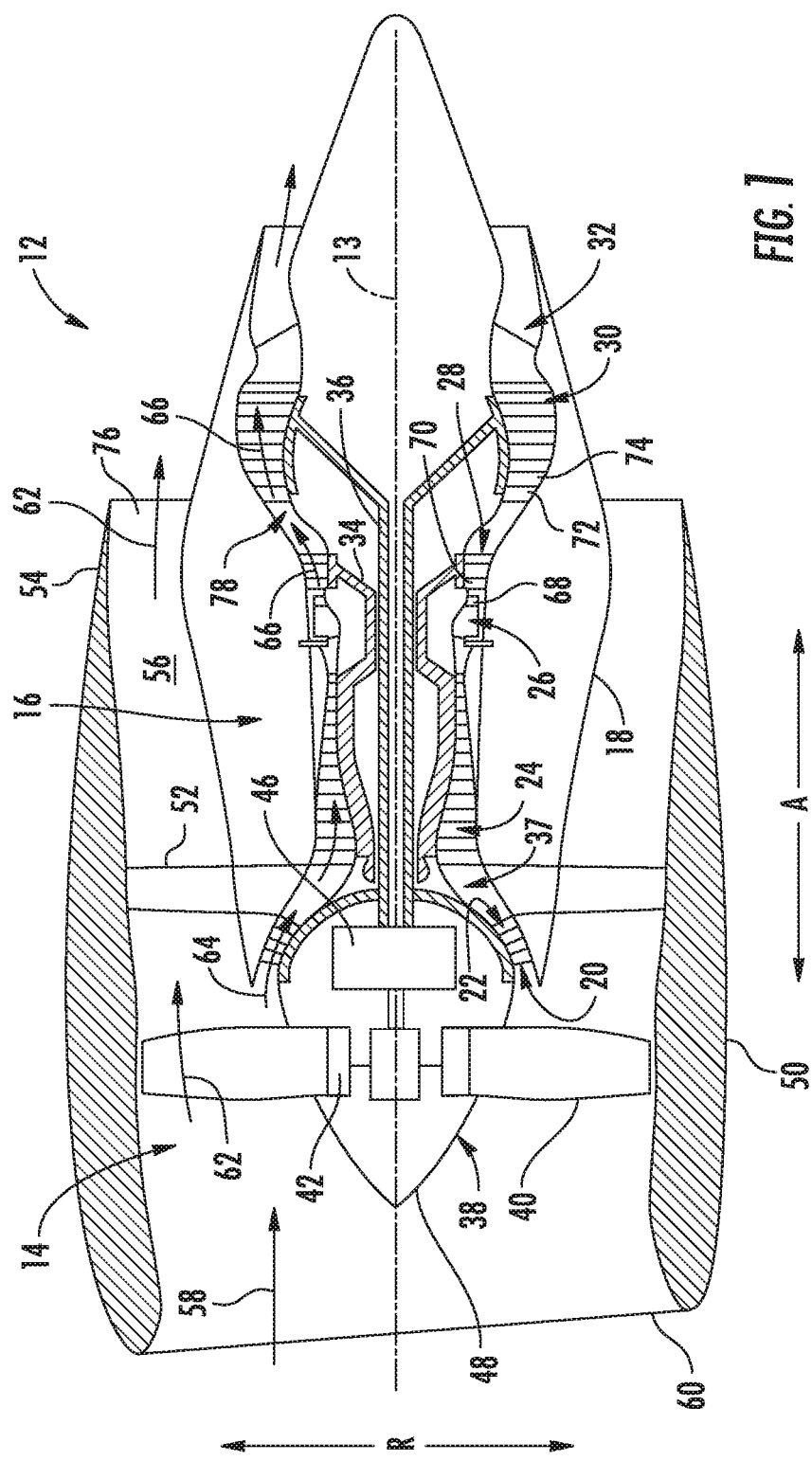
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a turbomachine in accordance with an exemplary embodiment of the present disclosure. More particularly, for the embodiment of FIG. 1, the turbomachine is configured as a gas turbine engine, or rather as a high-bypass turbofan jet engine 12, referred to herein as "turbofan engine 12." As shown in FIG. 1, the turbofan engine 12 defines an axial direction A (extending parallel to a longitudinal centerline 13 provided for reference), a radial direction R, and a circumferential direction C (FIG. 6), i.e., a direction extending about the axial direction A. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases and the core turbine engine 16 includes, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Accordingly, the LP shaft 36 and HP shaft 34 are each rotary components, rotating about the axial direction A during operation of the turbofan engine 12.

Referring still to the embodiment of FIG. 1, the fan section 14 includes a fan 38 having a plurality of fan blades 40 coupled to a disk 42 in a spaced apart manner. As depicted, the fan blades 40 extend outwardly from disk 42 generally along the radial direction R. The fan blades 40 and disk 42 are together rotatable about the longitudinal axis 13 by LP shaft 36. More particularly, the fan section includes a fan shaft rotatable by the LP shaft 36. Accordingly, the fan shaft may also be considered a rotary component and is similarly supported by one or more bearings.

Referring still to the exemplary embodiment of FIG. 1, the disk 42 is covered by a front hub 48 aerodynamically contoured to promote an airflow through the plurality of fan blades 40. Front hub 48 may rotate with fan 38 about longitudinal centerline 13. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 12, a volume of air 58 enters the turbofan 10 through an associated inlet 60 of the nacelle 50 and/or fan section 14. As the volume of air 58 passes across the fan blades 40, a first portion 62 of the air 58 is directed or routed into the bypass airflow passage 56 and a second portion 64 of the air 58 is directed or routed into the core air flowpath 37, or more specifically into the LP compressor 22. The ratio between the first portion 62 of air and the second portion 64 of air is commonly known as a bypass ratio. The pressure of the second portion 64 of air is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion 62 of air 58 is substantially increased as the first portion 62 of air is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated that the exemplary turbofan engine 12 depicted in FIG. 1 is by way of example only. In other exemplary embodiments, the turbofan engine 12 may have any other suitable configuration.

Figure 2:
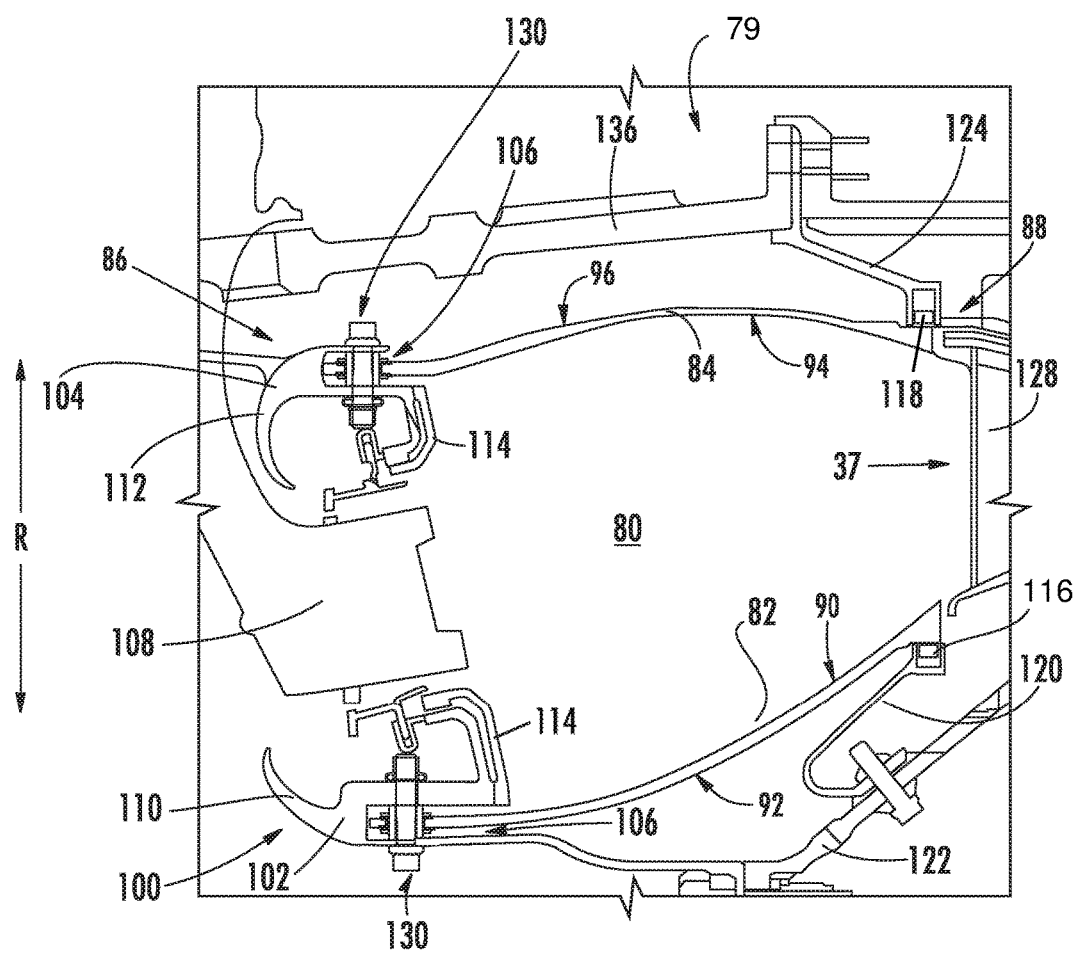
FIG. 2 is a schematic side view of a combustion section and a turbine section of the exemplary gas turbine engine of FIG. 1.

Referring now to FIG. 2, a schematic, cross-sectional view is provided of a combustor assembly 79 according to an exemplary embodiment of the present subject matter. More particularly, FIG. 2 provides a side, cross-sectional view of an exemplary combustor assembly 79, which may, for example, be positioned in the combustion section 26 of the exemplary turbofan engine 12 of FIG. 1.

Combustor assembly 79 depicted in FIG. 2 generally includes a combustion chamber 80 defined by an inner liner 82 and an outer liner 84, e.g., combustion liners 82, 84 together at least partially define combustion chamber 80 therebetween. Combustion liners 82, 84, or other components of combustor assembly 79, may be made from a ceramic matrix composite (CMC) material as further described below. Combustor assembly 79 extends generally along the axial direction A from a forward end 86 to an aft end 88. Inner liner 82 generally defines a hot side 90 exposed to and defining in part a portion of the core air flowpath 37 extending through the combustion chamber 80. Inner liner 82 further defines a cold side 92 opposite hot side 90. Similarly, outer liner 84 also defines a hot side 94 exposed to and defining in part a portion of the core air flowpath 37 extending through the combustion chamber 80, and outer liner 84 further defines a cold side 96 opposite hot side 94.

The inner and outer liners 82, 84 are each attached to an annular dome 100 at the forward end 86 of combustor assembly 79. More particularly, annular dome 100 includes an inner dome section 102 attached to inner liner 82 and an outer dome section 104 attached to outer liner 84. The inner and outer dome sections 102, 104 may each extend along the circumferential direction C to define an annular shape. Inner and outer dome sections 102, 104 each also define a slot 106 for receipt of inner liner 82 and outer liner 84, respectively.

The combustor assembly 79 further includes a plurality of fuel air mixers 108 spaced along the circumferential direction C and positioned at least partially within the annular dome 100. More particularly, the plurality of fuel air mixers 108 are disposed at least partially between outer dome section 104 and inner dome section 102 along the radial direction R. Compressed air from the compressor section of the turbofan engine 12 flows into or through the fuel air mixers 108, where the compressed air is mixed with fuel and ignited to create the combustion gases 66 within the combustion chamber 80. The inner and outer dome sections 102, 104 are configured to assist in providing the flow of compressed air from the compressor section into or through the fuel air mixers 108. For example, inner dome section 102 includes an inner cowl 110, and outer dome section 104 similarly includes an outer cowl 112. The inner and outer cowls 110, 112 may assist in directing the flow of compressed air from the compressor section into or through one or more of the fuel air mixers 108.

In certain exemplary embodiments, the inner dome section 102 with inner cowl 110 may be formed integrally as a single annular component, and similarly, the outer dome section 104 with outer cowl 112 also may be formed integrally as a single annular component. It should be appreciated, however, that in other exemplary embodiments, the inner dome section 102 and/or the outer dome section 104 alternatively may be formed by one or more components being joined in any suitable manner. For example, with reference to the outer dome section 104, in certain exemplary embodiments, outer cowl 112 may be formed separately from outer dome section 104 and attached to outer dome section 104 using, e.g., a welding process. Additionally or alternatively, the inner dome section 102 may have a similar configuration.

Referring still to FIG. 2, the exemplary combustor assembly 79 further includes a heat shield 114 positioned around the fuel air mixer 108 as depicted. The exemplary heat shield 114, for the embodiment depicted, is attached to and extends between inner and outer dome sections 102, 104. The heat shield 114 is configured to protect certain components of the turbofan engine 12 from the relatively extreme temperatures of the combustion chamber 80.

Keeping with FIG. 2, combustor assembly 79 at the aft end 88 includes an inner piston ring seal 116 at inner liner 82 and an outer piston ring seal 118 at outer liner 84. The inner piston ring seal 116 is attached to an inner piston ring holder 120 extending from and attached to an inner casing 122. Similarly, the outer piston ring seal 118 is attached to an outer piston ring holder 124 extending from and attached to an outer casing 126. Inner piston ring holder 120 and outer piston ring holder 124 are configured to accommodate an expansion of the inner liner 82 and the outer liner 84 generally along the axial direction A, as well as generally along the radial direction R. To allow for a relative thermal expansion between the outer liner 84 and the outer dome section 104, as well as between the inner liner 82 and the inner dome section 102, a plurality of mounting assemblies 130 are used to attach outer liner 84 to outer dome section 104 and inner liner 82 to inner dome section 104. More particularly, the mounting assemblies 130 attach the forward end of outer liner 84 to outer dome section 104 within the slot 106 of outer dome section 104 and the forward end of inner liner 82 to inner dome section 102 within the slot 122 of inner dome section 102. As further described herein, when formed from CMC materials, inner and outer liners 82, 84 may be formed to hold dimensional tolerances and/or to minimize variations in the thickness of the liners, e.g., to ensure proper fitment with inner and outer piston ring seals 116, 118 and slots 122 of dome sections 102, 104 such that inner and outer liners 82, 84 may thermally expand without damaging the liners and/or any adjacent components.

Further, as is discussed above, the combustion gases 66 flow from the combustion chamber 80 into and through the turbine section of the turbofan engine 12, where a portion of thermal and/or kinetic energy from the combustion gases 66 is extracted via sequential stages of turbine stator vanes and turbine rotor blades. A stage one (1) stator vane 128 is depicted schematically in FIG. 2, aft of the combustor assembly 79.

In some embodiments, components of turbofan engine 12, particularly components within hot gas path 78, may comprise a ceramic matrix composite (CMC) material, which is a non-metallic material having high temperature capability. For the depicted embodiment, inner liner 82 and outer liner 84 of combustor 79 are each formed of a CMC material. Exemplary CMC materials utilized for such components may include silicon carbide, silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). As further examples, the CMC materials may also include silicon carbide (SiC) or carbon fiber cloth. Of course, other appropriate materials, including other composite materials, may be used to form the components of engine 12, including the components within hot gas path 78 such as inner and outer combustion liners 82, 84.

Figure 3:
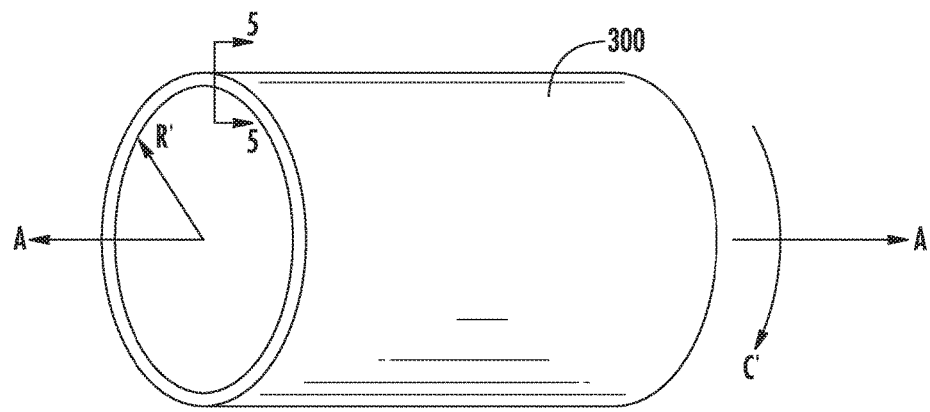
FIG. 3 is a schematic side view of a CMC component preform in accordance with an exemplary embodiment of the present subject matter.

Turning to FIG. 3, a schematic illustration is provided of an exemplary CMC component preform 300, e.g., a preform for forming a CMC component of turbofan engine 12 such as outer liner 84 of combustor 79. Although the schematic illustration of FIG. 3 depicts the CMC component preform 300 as generally cylindrical, it will be appreciated that preform 300 may have any appropriate shape for forming the resultant CMC component. In particular embodiments, the resultant CMC component may be axisymmetric, i.e., symmetric about an axis A-A, which may be longitudinal axis 13 of engine 12 in embodiments in which the resultant CMC component is a component of engine 12. Accordingly, to form an axisymmetric CMC component, the component preform 300 may be axisymmetric, e.g., as shown in FIG. 3, preform 300 is symmetric about axis A-A. However, in other embodiments, the CMC component may have other shapes or configurations, and preform 300 has a shape or contour appropriate for forming the CMC component. As further shown in FIG. 3, the preform 300 defines a radial direction R' that is orthogonal to axis A-A, as well as a circumferential direction C' that extends about axis A-A. In some embodiments where preform 300 results in a component of engine 12, the radial direction R' may be the radial direction R and the circumferential C' may be the circumferential direction C defined by engine 12.

Figure 4:
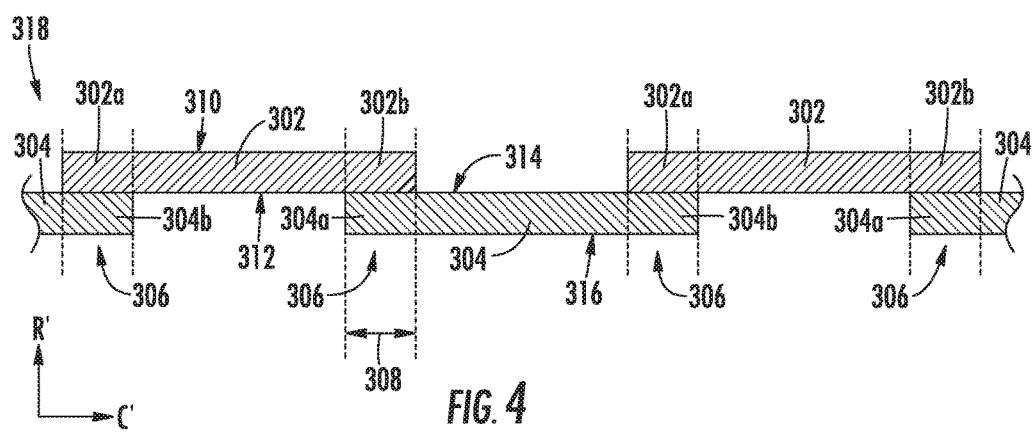
FIG. 4 is a schematic view of a plurality of CMC plies in accordance with an exemplary embodiment of the present subject matter.

Referring now to FIG. 4, CMC component preform 300 may be made from a plurality of CMC plies, in particular, a plurality of first CMC plies 302 and a plurality of second CMC plies 304. In the exemplary embodiment shown in FIG. 4, the plurality of CMC plies are arranged such that second CMC plies 304 overlap first CMC plies 302. More specifically, each of first CMC plies 302 has ends 302a, 302b and each of second CMC plies 304 has ends 304a, 304b. Ends 304a, 304b of second CMC plies 304 overlap ends 302a, 302b of first CMC plies 302 such that each end 304a, 304b of each second CMC ply 304 overlies an end 304a or 304b of a first CMC ply 302. By overlapping ends 302a, 302b with ends 304a, 304b, first CMC plies 302 are in contact with second CMC plies 304 along the ends of the plies 302, and second plies 304 are in contact with first plies 302 along the ends of the plies 304. The overlapping ends of first and second CMC plies 302, 304 define a plurality of overlap regions 306 that are spaced apart from one another along the circumferential direction C'. Further, the first and second CMC plies 302, 304 are arranged such that the ceramic fibers within each ply 302, 304 are oriented along the circumferential direction C'. That is, when laid up to form CMC component preform 300, the ceramic fibers within first CMC plies 302 are oriented in the same direction as the ceramic fibers within second CMC plies 304, and in the exemplary preform 300, the fibers of first and second plies 302, 304 are oriented along the circumferential direction C'. Overlapping first and second plies 302, 304 such that their ceramic fibers are overlapped in the circumferential or hoop direction can provide the structure needed to carry mechanical hoop strength in the resultant CMC component because the overlapped plies help ensure there are no breaks or cuts in the fibers extending along the circumferential direction C'.

First and second CMC plies 302, 304 may be, e.g., plies pre-impregnated (prepreg) with matrix material and may be formed from prepreg tapes or the like. For example, the CMC plies may be formed from a prepreg tape comprising a desired ceramic fiber reinforcement material, one or more precursors of the CMC matrix material, and organic resin binders. According to conventional practice, prepreg tapes can be formed by impregnating the reinforcement material with a slurry that contains the ceramic precursor(s) and binders. The slurry also may contain solvents for the binders that promote the fluidity of the slurry to enable impregnation of the fiber reinforcement material, as well as one or more particulate fillers intended to be present in the ceramic matrix of the CMC component, e.g., silicon and/or SiC powders in the case of a Si—SiC matrix. Preferred materials for the precursor will depend on the particular composition desired for the ceramic matrix of the CMC component. For example, the precursor material may be SiC powder and/or one or more carbon-containing materials if the desired matrix material is SiC; notable carbon-containing materials include carbon black, phenolic resins, and furanic resins, including furfuryl alcohol ($C_4H_3OCH_2OH$). Of course, the plurality of CMC plies 302, 304 may formed in other ways as well.

Referring still to FIG. 4, end 304b of second plies 304 overlies or overlaps end 302a of first plies 302 such that ends 304b, 302a are in contact for a contact length 308. End 304a of second plies 304 overlies or overlaps end 302b of first plies 302 such that ends 304a, 302b are in contact for contact length 308. More particularly, each first CMC ply 302 has an inner surface 310 and an outer surface 312, and each second CMC ply 304 has an inner surface 314 and an outer surface 316. As illustrated in FIG. 4, inner surface 314 of second ply 304 contacts outer surface 312 of first ply 302 along the contact length 308 at ends 304b, 302a and 304a, 302b such that the ends 304a, 304b of second ply 304 overlap the ends 302a, 302b of first ply 302. Each of the overlapping ends defines an overlap region 306, which has a width equal to the contact length 308 over which the ends 304b, 302a and 304a, 302b are in contact.

Further, as depicted in FIG. 4, first CMC plies 302 and second CMC plies 304 are overlapped such that the plurality of CMC plies 302, 304 extends along the circumferential direction C'. By overlapping the ends of adjacent plies 302, 304, when CMC component preform 300 undergoes processing, e.g., to debulk and densify the CMC material as described below, a continuous ring of ceramic fibers may be oriented along the circumferential direction C', which helps to impart hoop strength to the resultant CMC component. Moreover, although shown as been substantially equal, each contact length 308, and accordingly, the width of each overlap region 306, need not be equal. However, each contact length 308 should be a sufficient length to ensure first plies 302 securely join with second plies 304 to form the continual ring of fibers along the circumferential direction C'.

Figure 5:
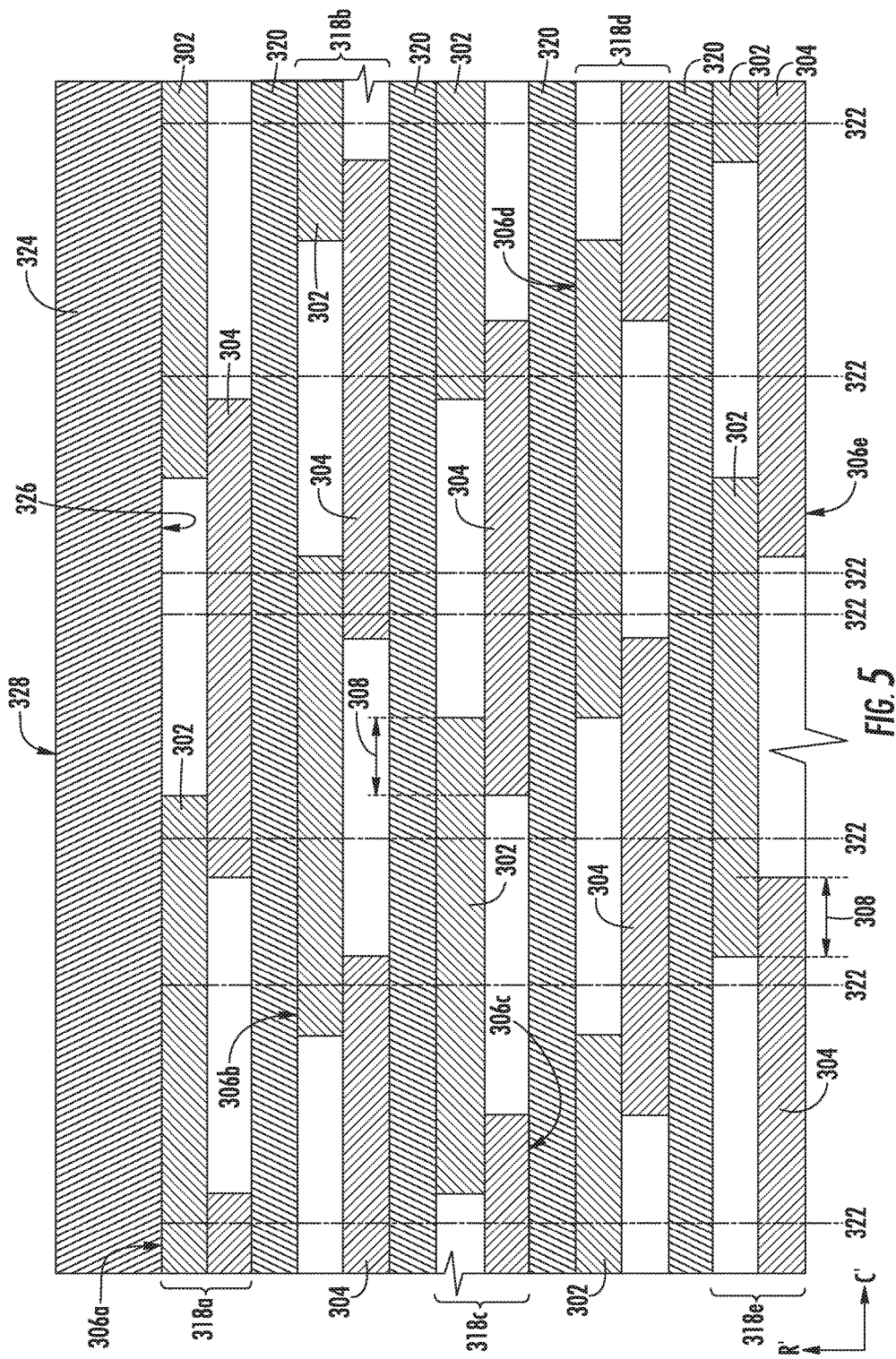
FIG. 5 is a schematic cross-section view, taken along the line 5-5 of FIG. 3, of a plurality of CMC plies forming the CMC component preform of FIG. 3 in accordance with an exemplary embodiment of the present subject matter.

Overlapped first and second CMC plies 302, 304 define a layer 318 of CMC plies, and a plurality of layers 318 may be used to form CMC component preform 300. For example, as shown in FIG. 5, the plurality of CMC plies may be arranged in a first layer 318a, a second layer 318b, a third layer 318c, a fourth layer 318d, and a fifth layer 318e. A layer of axial CMC plies 320 is disposed between each layer 318 of first and second plies 302, 304. Axial plies 320 have ceramic fibers that extend generally axially within CMC component preform 300, i.e., the fibers extend generally parallel to axis A-A, about which preform 300 is symmetric. In embodiments in which component preform 300 is an outer liner preform for forming outer liner 84 of engine 12, axis A-A may be longitudinal centerline 13 of engine 12 or axis A-A may be parallel to longitudinal centerline 13. Further, axial plies 320 may be laid up such that butt joints are formed between adjacent axial plies 320. That is, adjacent axial plies 320 may be butted up against one another along their edges such that, unlike first and second CMC plies 302, 304, an axial CMC ply 320 does not overlap an adjacent axial ply 320, although adjacent axial plies 320 may be in contact with one another.

Further, as illustrated in FIG. 5, each layer 318 of first and second CMC plies 302, 304 defines a plurality of overlap regions 306. More particularly, first layer 318a of CMC plies defines first overlap regions 306a, second layer 318b of CMC plies defines second overlap regions 306b, third layer 318c of CMC plies defines third overlap regions 306c, fourth layer 318d of CMC plies defines fourth overlap regions 306d, and fifth layer 318e of CMC plies defines fifth overlap regions 306e. Each layer 318 is positioned such that no two overlap regions 306 are radially aligned. For example, second layer 318b is positioned with respect to first layer 318a such that second overlap regions 306b are offset from first overlap regions 306a along the circumferential direction C'. That is, none of the plurality of second overlap regions 306b is radially aligned with a first overlap region 306a. Similarly, second layer 318b is positioned with respect to third, fourth, and fifth layers 318c, 318d, 318e such that second overlap regions 306b also are offset from third overlap regions 306c, fourth overlap regions 306d, and fifth overlap regions 306e along the circumferential direction C'. More specifically, each layer 318 is positioned with respect to the other layers 318 such that no overlap region 306 is radially aligned with another overlap region 306. Accordingly, any radial line 322 drawn through layers 318a, 318b, 318c, 318d, 318e and the layers of axial plies 320, which form CMC component preform 300, passes through the same number of plies 302, 304, 320 and does not pass through more than one overlap region 306.

It will be appreciated that FIG. 5 is provided by way of example only. In other embodiments, layers 318 may be circumferentially and/or radially arranged in any order, including but not limited to the order shown in FIG. 5. However, regardless of the order in which the layers are arranged, layers 318 are positioned such that no overlap region 306 is radially aligned with another overlap region 306. Further, although illustrated in FIG. 5 as including five layers 318 with one layer of axial plies 320 between layers 318, in other embodiments the CMC component preform 300 may include any suitable number of layers 318 with any suitable number of axial plies 320 between the layers 318.

Referring still to FIG. 5, it will be appreciated that the plurality of CMC plies may be laid up on a layup tool 324 to form CMC component preform 300. Although shown as generally linear in the schematic illustration of FIG. 5, tool 324 may be generally cylindrical in shape with an inner surface 326 and an outer surface 328. In such embodiments, the CMC plies may be laid up on or against the generally cylindrical inner surface 326 of tool 324 to form a generally cylindrical, axisymmetric CMC component preform 300. As such, each successive layer 318 of first and second CMC plies 302, 304 may be positioned radially inward with respect to the preceding layer 318. In other embodiments, tool 324 may have any appropriate shape or configuration for laying up the plurality of CMC plies to define the shape or contour of CMC component preform 300, and the plurality of CMC plies 302, 304 may be laid up on inner surface 326 or outer surface 328 of tool 324 as appropriate.

Figure 6:
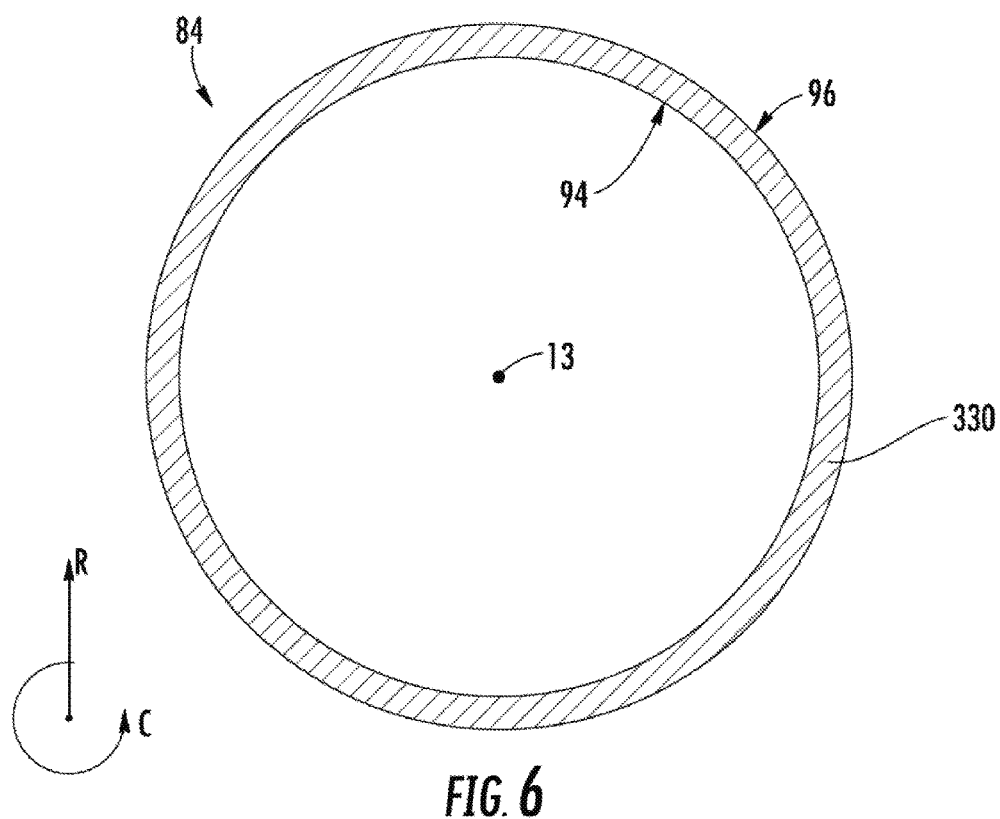
FIG. 6 is a cross-sectional view of an outer liner of a combustor of the gas turbine engine of FIG. 2, formed in accordance with an exemplary embodiment of the present subject matter.

Turning now to FIG. 6, a schematic cross-section view of outer liner 84 of FIG. 2 is provided. In the depicted exemplary embodiment of the present subject matter, outer liner 84 is a CMC body 330 that is symmetric about longitudinal centerline 13 of engine 12, i.e., centerline 13 is the axis of symmetry for CMC body 330. The CMC body 330 defines the circumferential direction C that extends about the centerline 13, as well as radial direction R, which is orthogonal to centerline 13. The CMC body 330 is formed from a plurality of CMC plies 302, 304, 320 as described above. More particularly, the CMC plies are laid up on a layup tool to define a generally smooth outer surface 96 of outer liner 84/CMC body 330. Further, the ends of a plurality of first CMC plies 302 and second CMC plies 304 are overlapped to define a plurality of overlap regions 306. Each overlap region 306 formed between contacting, overlapped plies 302, 304 is offset along the circumferential direction C such that no two overlap regions 306 are aligned along any radial line 322 drawn through longitudinal centerline 13. That is, any radial line 322 drawn through centerline 13 passes through only one overlap region 306. Further, as described above, each of first and second CMC plies 302, 304 comprises a plurality of ceramic fibers that are oriented substantially along one direction. The CMC plies 302, 304 forming CMC body 330 are positioned such that the ceramic fibers of first and second CMC plies 302, 304 are oriented along the circumferential direction C. Thus, overlapping ends of the plurality of first and second CMC plies 302, 304, which may be arranged in a plurality of layers 318 with axial plies 320 disposed between each layer 318 as previously discussed, forms a continuous ring of ceramic fibers in the circumferential direction C.

Accordingly, by offsetting overlap regions 306, the inner surface 94 of outer liner 84 generally is smooth and the CMC body 330 defining outer liner 84 has a substantially uniform thickness. More particularly, overlapping plies are not built up along the radial direction R, which could result in a liner 84 having one or more sections that are thicker than other sections of the liner such that the liner does not have a uniform thickness. Rather, the overlap regions 306 are distributed throughout the component such that liner 84 has a substantially uniform thickness and a generally smooth surface opposite the tooled surface, which is also a generally smooth surface if the tool on which the plies were laid up is substantially smooth. The generally smooth surfaces and substantially uniform thickness can help outer liner 84 properly interface with interfacing components such as outer dome section 104 and/or outer piston ring seal 118 as described above, as well as provide a smooth flow path for combustion gases 66. Further, while FIG. 6 depicts outer liner 84, it should be appreciated that inner liner 82 or any other appropriate component of engine 12 may be formed in substantially the same manner as the depicted outer liner 84 such that outer liner 84, inner liner 82, or other CMC component of engine 12 has a substantially uniform thickness. Additionally or alternatively, other components that are made using CMC materials, particularly axisymmetric CMC components, may be formed as described with respect to outer liner 84.

Figure 7:
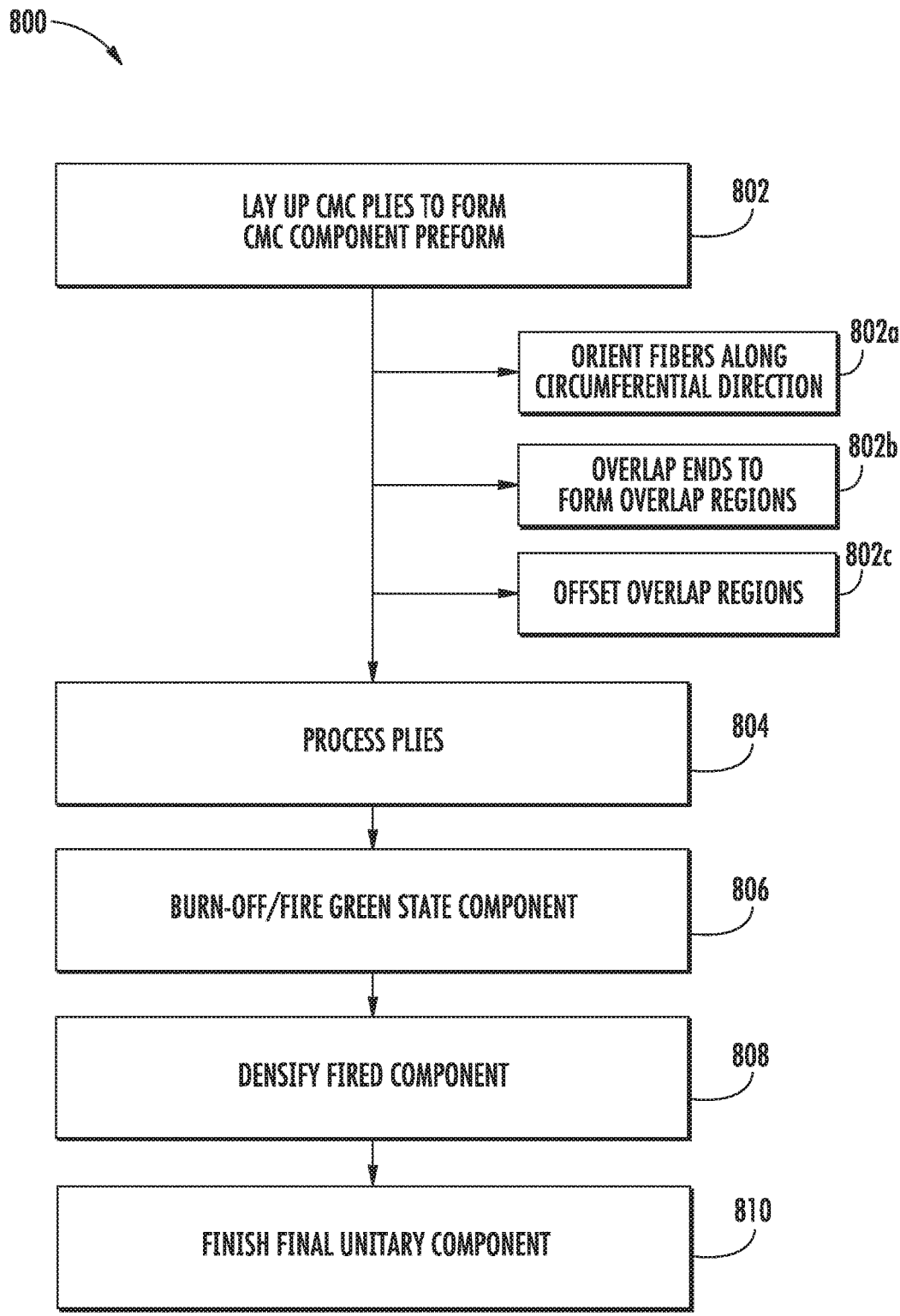
FIG. 7 is a flow diagram of a method for forming a CMC component in accordance with an exemplary embodiment of the present subject matter.

FIG. 7 provides a flow diagram illustrating a method 800 for forming a CMC component according to an exemplary embodiment of the present subject matter. For example, the CMC component may be outer liner 84 for combustor 79 of gas turbine engine 12. As shown at 802 in FIG. 7, a plurality of plies of a CMC material for forming the CMC component may be laid up to form CMC component preform 300 having a desired shape or contour. The desired shape of CMC component preform 300 may be a desired shape or contour of the resultant CMC component. As an example, the plies may be laid up to define a shape of CMC component preform 300 that is the shape of outer liner 84. As described above, the plurality of CMC plies 302, 304, 320 forming preform 300 may be laid up on layup tool 324 or may be laid up on another appropriate device for supporting the plies and/or for defining the desired shape.

Further, as described above, laying up the plurality of first and second CMC plies 302, 304 may comprise orienting the ceramic fibers of the CMC plies 302, 304 along the circumferential direction C', as shown at 802a in FIG. 7. Further, as shown at 802b, laying up first and second CMC plies 302, 304 may include overlapping ends of plies 302, 304 to form a plurality of overlap regions 306. Overlapping ends of the plurality of CMC plies includes positioning ends 302a, 302b of the plurality of first CMC plies 302 in contact with ends 304a, 304b of the plurality of second CMC plies 304. More particularly, each end of each second CMC ply 304 may be positioned to contact an end of a first CMC ply 302 over contact length 308. Each contact length 308 defines the width of the corresponding overlap region 306. By overlapping ends of plies 302, 304 with the ceramic fibers of the plies oriented along the circumferential direction C', a continuous ring of ceramic fibers may be formed along the circumferential direction C'.

Moreover, plies 302, 304 may be laid up in a plurality of layers 318, each layer having a plurality of overlapped first and second CMC plies 302, 304 and, thus, a plurality of overlap regions 306. Referring still to FIG. 7, as shown at 802c, laying up plies 302, 304 in layers 318 further may comprise offsetting overlap regions 306 of each layer 318 such that any radial line 322 drawn through axis A-A of CMC component preform 300 does not pass through more than one overlap region 306. Additionally, laying up the plurality of CMC plies may comprise laying up axial plies 320 between layers 318 of first and second plies 302, 304. That is, layers 318 of first and second plies 302, 304 may be alternated with layers of axial plies 320. More particularly, layers 318 of plies 302, 304 are laid up to alternate with layers of axial plies 320 and to offset overlap regions 306 of layers 318 along the circumferential direction C' such that any radial line 322 drawn through axis A-A and the layup passes through the same number of plies 302, 304, 320 and passes through only one overlap region 306.

After the plurality of plies 302, 304, 320 are laid up, the plies may be processed, e.g., compacted and cured in an autoclave, as shown at 804 in FIG. 7. After processing, the plies form a green state CMC component, e.g., a green state CMC outer liner 84. The green state CMC component is a single piece component, i.e., curing plies 302, 304, 320 joins the plies to produce a CMC component formed from a continuous piece of CMC material. The green state component then may undergo firing (or burn-off) and densification, illustrated at 806 and 808 in FIG. 7, to produce a final CMC component. In an exemplary embodiment of method 800, the green state component is placed in a furnace with silicon to burn off any mandrel-forming materials and/or solvents used in forming the CMC plies 302, 304, 320, to decompose binders in the solvents, and to convert a ceramic matrix precursor of the plies into the ceramic material of the matrix of the CMC component. The silicon melts and infiltrates any porosity created with the matrix as a result of the decomposition of the binder during burn-off/firing; the melt infiltration of the CMC component with silicon densifies the CMC component. However, densification may be performed using any known densification technique including, but not limited to, Silcomp, melt-infiltration (MI), chemical vapor infiltration (CVI), polymer infiltration and pyrolysis (PIP), and oxide/oxide processes. In one embodiment, densification and firing may be conducted in a vacuum furnace or an inert atmosphere having an established atmosphere at temperatures above 1200° C. to allow silicon or another appropriate material or materials to melt-infiltrate into the component 100. Optionally, as shown at 810 in FIG. 7, after firing and densification the CMC component may be finish machined, if and as needed, and/or coated with an environmental barrier coating (EBC).

Method 800 is provided by way of example only. For example, other processing cycles, e.g., utilizing other known methods or techniques for compacting and/or curing CMC plies, may be used. Further, the CMC component may be post-processed or densified using any appropriate means. Alternatively, any combinations of these or other known processes may be used as well. Moreover, in some embodiments, a material other than a CMC material may be used to form the component, and such embodiments may include laying up plies of the other material by overlapping and offsetting the plies as described above. Any appropriate processing cycles and the like may be used to cure the component and thereby produce the final component, e.g., as described with respect to method 700. This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for forming a component, the method comprising:
    laying up a plurality of plies to form a component preform, the component preform defining an axis of symmetry, a radial direction, and a circumferential direction that extends about the axis of symmetry, wherein laying up the plurality of plies includes
    defining a plurality of layers along the radial direction, each layer formed by overlapping ends of a plurality of first plies with ends of a plurality of second plies, each overlapped end defining an overlap region, each first ply and each second ply comprising a plurality of fibers extending along the circumferential direction such that the fibers in the plurality of first plies extend in the same direction as the fibers in the plurality of second plies, and
    offsetting the overlap regions along the circumferential direction such that any radial line drawn from the axis of symmetry through the plurality of plies passes through only one overlap region.

2. The method of claim 1, wherein a row of axial plies is disposed between each layer, wherein each axial ply comprises a plurality of fibers extending along the axis of symmetry.

3. The method of claim 2, wherein any radial line drawn from the axis of symmetry through the plies passes through the same number of first, second, and axial plies.

4. The method of claim 2, further comprising:
    butting adjacent axial plies in the row of axial plies against one another along their edges such that one axial ply does not overlap an adjacent axial ply in the row of axial plies.

5. The method of claim 2, wherein each axial ply is an axial ceramic matrix composite ply such that the plurality of fibers is a plurality of ceramic fibers.

6. The method of claim 1, wherein defining a plurality of layers comprises defining at least five layers.

7. The method of claim 1, wherein laying up the plurality of plies comprises laying up the plurality of plies on a generally cylindrical layup tool.

8. The method of claim 7, wherein the plurality of plies is laid up on an inner surface of the layup tool.

9. The method of claim 1, wherein the component is an outer liner of a combustor assembly.

10. The method of claim 1, wherein the plurality of first plies is a plurality of first ceramic matrix composite (CMC) plies and the plurality of second plies is a plurality of second CMC plies such that the plurality of fibers is a plurality of ceramic fibers.

11. A composite component, comprising:
- a body, the body symmetric about an axis of symmetry, the body defining a circumferential direction about the axis of symmetry and a radial direction orthogonal to the axis of symmetry,
- wherein the body is formed from a plurality of first ceramic matrix composite (CMC) plies, a plurality of second CMC plies, and a plurality of axial CMC plies,
- wherein ends of the plurality of first CMC plies are overlapped with ends of the plurality of second CMC plies to define a plurality of overlap regions,
- wherein the overlap regions in radially successive layers of the first and second CMC plies are offset along the circumferential direction,
- wherein each first CMC ply and each second CMC ply comprises a plurality of ceramic fibers extending along the circumferential direction such that the fibers in the plurality of first CMC plies extend in the same direction as the fibers in the plurality of second CMC plies,
- wherein a layer of axial CMC plies is disposed between each layer of the first and second CMC plies,
- wherein any radial line drawn from the axis of symmetry through the CMC plies passes through only one overlap region and through the same number of first, second, and axial CMC plies, and
- wherein the body has a substantially uniform thickness.

12. The composite component of claim 11, wherein ends of the plurality of first CMC plies are overlapped with ends of the plurality of second CMC plies to form a continuous ring of ceramic fibers in the circumferential direction.

13. A method for forming a component, the method comprising:
- laying up a plurality of ceramic matrix composite (CMC) plies to form a component preform, the component preform defining an axis of symmetry, a radial direction, and a circumferential direction that extends about the axis of symmetry, wherein laying up the plurality of CMC plies includes
  - defining a plurality of layers along the radial direction, each layer formed by overlapping each end of a plurality of first CMC plies with an end of a plurality of second CMC plies such that each first CMC ply in a layer overlaps two second CMC plies in the layer and each second CMC ply in the layer overlaps two first CMC plies in the layer, each overlapped end of a first CMC ply in contact with one end of a second CMC ply over a contact length,
  - laying up a plurality of axial CMC plies such that an axial CMC ply is disposed between each layer, and
  - offsetting the overlapped ends along the circumferential direction such that any radial line drawn from the axis of symmetry through the plurality of CMC plies passes through only one contact length and through the same number of first, second, and axial CMC plies,
- wherein each first CMC ply and each second CMC ply comprises a plurality of ceramic fibers extending along the circumferential direction such that the fibers in the plurality of first CMC plies extend in the same direction as the fibers in the plurality of second CMC plies.

14. The method of claim 13, further comprising processing the plurality of CMC plies to form a green state component.

15. The method of claim 14, further comprising firing the green state component to produce a fired component.

16. The method of claim 15, further comprising densifying the fired component to produce a final CMC component.

17. The method of claim 16, wherein the final CMC component is generally cylindrical.

18. The method of claim 17, wherein the final CMC component is an outer liner of a combustor assembly.

* * * * *